United States Patent
Ronning

(10) Patent No.: US 10,321,672 B2
(45) Date of Patent: Jun. 18, 2019

(54) WILDLIFE DETERRENCE USING MONO-COLORED LIGHT TO INDUCE NEUROPHYSICAL BEHAVIORAL RESPONSES IN ANIMALS

(71) Applicant: Lite Enterprises Inc., Nashua, NH (US)

(72) Inventor: Donald Ronning, Nashua, NH (US)

(73) Assignee: LITE ENTERPRISES INC., Nashua, NH (US)

(*) Notice: Subject to any disclaimer, the term of this patent is extended or adjusted under 35 U.S.C. 154(b) by 254 days.

(21) Appl. No.: 15/287,811

(22) Filed: Oct. 7, 2016

(65) Prior Publication Data

US 2017/0099827 A1   Apr. 13, 2017

Related U.S. Application Data

(60) Provisional application No. 62/238,158, filed on Oct. 7, 2015.

(51) Int. Cl.
  *A01M 29/10*  (2011.01)
  *A01M 29/16*  (2011.01)
  (Continued)

(52) U.S. Cl.
  CPC ............ *A01M 29/10* (2013.01); *A01M 29/16* (2013.01); *A01M 29/32* (2013.01); *H05B 33/086* (2013.01)

(58) Field of Classification Search
  CPC ...... A01M 29/00; A01M 29/06; A01M 29/08; A01M 29/10; A01M 29/14; A01M 29/16; A01M 29/30; A01M 29/32; A01M 31/002
  See application file for complete search history.

(56) References Cited

U.S. PATENT DOCUMENTS 3,903,501 A   9/1975   Greenlee et al.
3,938,149 A   2/1976   Grantham
(Continued)

FOREIGN PATENT DOCUMENTS

DE         10213473        10/2003
DE      20 2007013399        7/2008
(Continued)

OTHER PUBLICATIONS

Bennett, A. T. D. and Cuthill, I. C. (1994). Ultraviolet vision in birds: what is its function? Vision Res. 34, 1471-1478, doi:10.1016/0042-6989(94)90149-X.
(Continued)

*Primary Examiner* — Van T Trieu
(74) *Attorney, Agent, or Firm* — Grossman, Tucker, Perreault & Pfleger, PLLC

(57) ABSTRACT

Wildlife deterrence methods and systems use mono-colored light within a sensitivity range of a short-wavelength-sensitive (SWS) photoreceptor of a species to be deterred, such as an avian species. The mono-colored light may be generated by one or more high brightness mono-colored light emitting diodes (LEDs) and may be within 25 nm of a peak absorption wavelength of the SWS photoreceptor of the species. The mono-colored light is directed to a deterrence area with an intensity sufficient to cause at least a temporary disruption of visual perception in the species to induce an augmented behavioral response in the species resulting in avoidance of the deterrence area. The mono-colored light may also be generated as intermittent pulses having a duration sufficient to keep a pupil of an eye of the species in a continuous unstable state to prevent light adaption by the species.

30 Claims, 6 Drawing Sheets

(51) Int. Cl.
  *A01M 29/32* (2011.01)
  *H05B 33/08* (2006.01)

(56) References Cited

U.S. PATENT DOCUMENTS

| | | | |
|---|---|---|---|
| 3,971,020 | A | 7/1976 | Howard |
| 4,736,907 | A | 4/1988 | Steffen |
| 4,952,939 | A | 8/1990 | Seed |
| 4,982,176 | A | 1/1991 | Schwarz |
| 5,128,683 | A | 7/1992 | Freedman |
| 5,248,919 | A | 9/1993 | Hanna et al. |
| 5,270,707 | A | 12/1993 | Schulte et al. |
| 5,448,243 | A | 9/1995 | Bethke et al. |
| 5,450,063 | A | 9/1995 | Peterson et al. |
| 5,685,636 | A | 11/1997 | German |
| 5,774,088 | A | 6/1998 | Kreithen |
| 5,969,593 | A | 10/1999 | Will |
| 6,016,100 | A | 1/2000 | Boyd et al. |
| 6,250,255 | B1 * | 6/2001 | Lenhardt ............... A01M 29/16  119/713 |
| 6,252,525 | B1 | 6/2001 | Philiben |
| 6,285,630 | B1 | 9/2001 | Jan |
| 6,328,986 | B1 * | 12/2001 | Ballinger, Jr. ........... A01C 1/06  424/405 |
| 6,407,670 | B1 | 6/2002 | Dysarsz et al. |
| 6,575,597 | B1 | 6/2003 | Cramer et al. |
| 6,653,971 | B1 | 11/2003 | Guice et al. |
| 6,681,714 | B1 | 1/2004 | Johnson |
| 6,906,659 | B1 | 6/2005 | Ramstack |
| 6,940,424 | B2 | 9/2005 | Philiben et al. |
| 6,980,119 | B2 | 12/2005 | Toulmin et al. |
| 7,106,216 | B1 | 9/2006 | Maher |
| 7,501,979 | B1 | 3/2009 | Guice et al. |
| 7,567,203 | B2 | 7/2009 | Dizaji |
| 7,783,427 | B1 | 8/2010 | Woodell et al. |
| 7,864,103 | B2 | 1/2011 | Weber et al. |
| 7,876,260 | B2 | 1/2011 | Laufer |
| 7,940,206 | B2 | 5/2011 | Nohara |
| 8,164,462 | B1 | 4/2012 | Bose et al. |
| 8,279,109 | B1 | 10/2012 | Piesinger |
| 8,474,411 | B2 | 7/2013 | Scott |
| 8,570,211 | B1 | 10/2013 | Piesinger |
| 8,616,144 | B2 | 12/2013 | Yifrach |
| 8,665,138 | B2 | 3/2014 | Laufer |
| 8,742,977 | B1 | 6/2014 | Piesinger |
| 8,810,411 | B2 | 8/2014 | Marka |
| 2003/0090391 | A1 | 5/2003 | Philiben et al. |
| 2003/0122680 | A1 | 7/2003 | Ardelan et al. |
| 2005/0162978 | A1 | 7/2005 | Lima |
| 2006/0109161 | A1 | 5/2006 | Krikorian |
| 2007/0001897 | A1 | 1/2007 | Alland |
| 2007/0086912 | A1 | 4/2007 | Dowling et al. |
| 2007/0190343 | A1 | 8/2007 | Arkles |
| 2008/0260531 | A1 | 10/2008 | Stommel |
| 2008/0266171 | A1 | 10/2008 | Weber et al. |
| 2008/0298962 | A1 | 12/2008 | Sliwa |
| 2009/0034259 | A1 | 2/2009 | Laufer |
| 2009/0165732 | A1 | 7/2009 | Farley |
| 2009/0179759 | A1 | 7/2009 | Koury |
| 2010/0201525 | A1 | 8/2010 | Bahat et al. |
| 2010/0236497 | A1 | 9/2010 | Philiben |
| 2011/0144829 | A1 | 6/2011 | Kim et al. |
| 2011/0163694 | A1 * | 7/2011 | Donners ............... A01M 29/10  315/297 |
| 2011/0203149 | A1 | 8/2011 | Grajcar |
| 2011/0260907 | A1 | 10/2011 | Roche |
| 2012/0038504 | A1 | 2/2012 | Yu et al. |
| 2013/0257641 | A1 | 10/2013 | Ronning |
| 2014/0036502 | A1 | 2/2014 | Peck |
| 2014/0261151 | A1 | 9/2014 | Ronning |

FOREIGN PATENT DOCUMENTS

| | | |
|---|---|---|
| WO | WO 2006118449 | 11/2006 |
| WO | WO 2010023253 | 3/2010 |

OTHER PUBLICATIONS

Collin SP, Davies WL, Hart NS, Hunt DM. The evolution of early vertebrate photoreceptors. Philosophical Transactions of the Royal Society B: Biological Sciences. 2009;364(1531):2925-2940. doi:10.1098/rstb.2009.0099.

Xuan Fujun, et.al, Behavioral evidence for cone-based ultraviolet vision in divergent bat species and implications for its evolution, Zoologia 29 (2): 109-114, Apr. 2012, doi: 10.1590/S1984-46702012000200000.

W. T. Allison, et. al., Degeneration and regeneration of ultraviolet cone photoreceptors during development in rainbow trout, vol. 499, Issue 5, pp. 702-715, Dec. 10, 2006, DOI: 10.1002/cne.21164.

J. Engelage, H.J. Bischof, (1993), Vision, brain, and behavior in birds, The organization of the tectofugal pathway in birds: a comparative view, eds Zeigler HP, Bischof HJ (MIT, Cambridge, MA), pp. 137-158.

G. Marin G, C. Salas, et. al., (2007), A cholinergic gating mechanism controlled by competitive interactions in the optic tectum of the pigeon. J Neurosci 27:8112-8121.

Givago Da Silva Souza, et. al., (2011) Comparative neurophysiology of spatial luminance contrast Sensitivity, Psychology & Neuroscience, 2011, 4, 1, 29-48, DOI: 10.3922/j.psns.2011.1.005.

S. Solomon, et. al., May 4, 2005, Chromatic Organization of Ganglion Cell Receptive Fields in the Peripheral Retina, The Journal of Neuroscience, 25(18): 4527-4539; doi: 10.1523/JNEUROSCI.3921-04.2005.

D. Hunt, et al., (Aug. 31, 2009), Evolution and spectral tuning of visual pigments in birds and mammals, Philosophical Transactions B of the Royal Society vol. 364 Issue: 1531, DOI: 10.1098/rstb_2009.0044.

E. Warrant, et. al., The Remarkable Visual Abilities of Nocturnal Insects: Neural Principles and Bioinspired Night-Vision Algorithms, Proceedings of the IEEE Oct. 2014; 102(10):1411-1426. DOI: 10.1109/JPROC.2014.2332533.

M. Mischaiati, et. al, (2015) Internal models direct dragonfly interception steering, Nature 517, 333-338, (Jan. 15, 2015) doi:10.1038/nature14045.

S. Kane, et. al., When hawks attack: animal-borne video studies of goshawk pursuit and prey-evasion strategies, Jan. 15, 2015 J Exp Biol 218, 212-222, doi: 10.1242/jeb.108597.

Y. Hazan, et. al., Published online Feb. 13, 2015, Visual-auditory integration for visual search: a behavioral study in barn owls Front Integr Neurosci. 2015; 9: 11 doi: 10.3389/fnint.2015.00011.

Osorio, D. et. al., Sep. 2008,A review of the evolution of animal color vision and visual communication signals, Vision Research, vol. 48, Issue 20, pp. 2042-2051, doi:10.1016/j.visres.2008.06.018.

Thomson R., et. al, (2006) Fear factor: prey habitat selection and its consequences in a predation risk landscape, Ecography, vol. 29, Issue 4, pp. 507-514, Aug. 2006, DOI: 10.1111/j.0906-7590.2006.04568.x.

Westneat, D., Fox C., (2010), Evolutionary Behavioral Ecology, Chapter 27, p. 553, Oxford University Press, ISBN 0195331931, 9780195331936.

Stevens M., et. al, (2009) Studying Primate Color: Towards Visual Systems-dependent Methods, Int J Primatol 30:893-917, doi:10.1007/s10764-009-9356-z.

Osorio, D. et. al., Camouflage and Perceptual Organization in the Animal Kingdom, The Oxford Handbook of Perceptual Organisation, Online Publication Date: Aug. 2014, DOI: 10.1093/oxfordhb/9780199686858.013.044.9.

Doppler M., et al. "Cowbird responses to aircraft with lights tuned to their eyes: Implications for bird-aircraft collisions." The Condor 117.2 (2015): 165-177.

Lind O.E, et. al., Multifocal optical systems and pupil dynamics in birds, Sep. 1, 2008 J Exp Biol 211, 2752-2758, doi: 10.1242/jeb.018630.

Moayed A., et. al., Stimulus-Specific Pupil Dynamics Measured in Birds (*Gallus gallus domesticus*) In Vivo with Ultrahigh Resolution Optical Coherence Tomography, Investigative Ophthalmology & Visual Science Oct. 2012, vol. 53, 6863-6869. doi:10.1167/iovs.12-10291.

(56) References Cited

OTHER PUBLICATIONS

Rozanowska, Nov./Dec. 2012, Light-Induced Damage to the Retina: Current Understanding of the Mechanisms and Unresolved Questions: A Symposium-in-Print, Photochemistry and Photobiology, vol. 88, Issue 6, pp. 1303-1308, http://dx.doi.org/10.1111/j.1751-1097.2012.01240.x.

Zele, A, et al., (Jan. 2015), Vision under mesopic and scotopic illumination, Frontiers in Psychology. vol. 6, Issue 5, No. 594, DOI: 10.3389/fpsyg.2015.0059si.

Vorobyev, M., & Osorio, D. (1998), Receptor noise as a determinant of colour thresholds, Proceedings of the Royal Society B: Biological Sciences, 265(1394), 351-358).

Johnson G. M., Fairchild M. D., 2001, On contrast sensitivity in an image difference model, Proc. of IS&T PICS Conference, pp. 18-23.

Hart, N. S., The visual ecology of avian photoreceptors, Progress in Retinal and Eye Research, vol. 2001; 20(5): 675-703, ISSN: 1350-9462.

International Search Report and Written Opinion dated Dec. 29, 2016 in corresponding PCT Patent Application No. PCT/US2016/055994.

Ronning, Wildlife Deterrence from Hazards Using High Brightness Ultraviolet Light, J. Chem. Chem. Eng. 10 (2016) 109-119; doi:10.17265/1934-7375/2016.03.001.

Ronning, D., S. Pelletier, C.R. Foss and T. Scott. 2015. 'Turn that light off please': Update on the use of a non-lethal wildlife deterrence device. Proceedings of the North American Birdstrike Conference 15. 38 pages. Presentation to Bird Strike Canada/Bird Strike Committee USA Conference, Montreal, Canada, Sep. 15, 2015.

Ronning, Donald (Lite Enterprises, Inc); Steve Pelletier, Trevor Peterson (Stantec Consulting Services) "Bird and Bat Mortality Reduction Using High Intensity Ultraviolet Lights." Poster presentation to National Wind Coordinating Collaborative Wind Wildlife Research Meeting IX, Nov. 27-30, 2012, Denver, Colorado.

Lite Enterprises presentation "Animal Deterrence System" to Federal Aviation Administration, Washington, DC Mar. 22, 2013.

Ronning, Donald, Carol R. Foss PhD, Peter Stocks, Lite Enterprises, INc., NH Audobon, Calendar Island Mussel Company presentation "High Brightness LEDs Deter Eider Predation at Mussel Rafts" to Northeast Aquaculture Conference, Jan. 2015.

LITE Enterprises, Inc. poster presentation "Wildlife Deterrence from Hazards Using High Brightness Ultraviolet Light" to NSF SBIR Workshop, Atlanta, Georgia, Jun. 2015.

Ronning, Donald presentation "Airport Birdstrike Mitigation Using High Intensity Monochromatic LEDs" to Illuminating Engineering Society of North America IES-ALC 2015 Fall Technology Meeting, Denver, Colorado, Oct. 22, 2015.

Ronning, Donald presentation "Seeing the Light: A New Aircraft-Based, Non-Lethal Wildlife Deterrence Device" to Bird Strike/Bird Strike Committee USA, Chicago, Illinois, Aug. 11, 2016.

European Search Report dated May 4, 2015 in Application No. 12832972.9 for PCT/US2012055977.

Chen Weishi et al: "Avian radar system based on two scanning modes," Journal of Beijing University of Aeronautics and Astronautics, vol. 35, No. 3, Mar. 1, 2009, pp. 380-383 XP055173767 (cited in European Search Report dated May 4, 2015 in Application No. 12832972.9 for PCT/US2012055977) Unable to find English language equivalent or English language abstract.

Odeen et al., Complex Distribution of Avian Color Vision Systems Revealed by Sequencing the SWS1 Opsin from Total DNA, Mol. Bio and Evol. 20(6):855-861 (2003).

O'Rourke, C, Hawk Eyes I: Diurnal Raptors Differ in Visual Fields and Degree of Eye Movement, PLoS One 5(9): e12802 (2010).

Willems, E., et al. Predator-specific landscapes of fear and resource distribution: effects on spatial range use, Ecology, 90(2): 546-555 (2009).

Odido, D. et al. Emerging Technologies: Use of Unmanned Aerial Systems in the Realisation of Vision 2030 Goals in the Counties, Int'l J. of App. Sci. and Tech. 3(8):107-127 (2013).

Vasarhelyi, Cs. et al., Outdoor flocking and formation flight with autonomous aerial robots, IROS 2014 Conference, http://arxiv.org/ftp/arxiv/papers/1402/1402.3588.pdf (2014).

Harris, R. et al., Evaluation of the Efficacy of Products and Techniques for Airport Bird Control, Transport Canada, 1-107 (1998).

Sauter, J. et al., Demonstration of Swarming Control of Unmanned Ground and Air Systems in Surveillance and Infrastructure Protection, IEEE Int'l Conference on Technologies for Homeland Security (2009).

Madin, E., et al. Do Behavioral Foraging Responses of Prey to Predators Function Similarly in Restored and Pristine Foodwebs? PLoS One 7(3):1-9 (2012).

Kocher, T., Adaptive Evolution and Explosive Speciation: The Cichlid Fish Model, Nature Reviews Genetics, 5:288-298 (2004).

Spady, T., et al., Adaptive Molecular Evolution in the Opsin Genes of Rapidly Speciating Cichlid Species, Mol. Biol. Evol., 22(6):1412-1422 (2005).

Ramsay, A., et al. Mitigating the Impact of Sea Duck Predation on PEI Mussel Farms, Prince Edward Island Aquaculture Alliance, http://www.aquaculturepei.com/media/news_industry/news_industry3.pdf (2011).

Hastad, O. et al., Ultraviolet vision and foraging in dip and plunge diving birds, Bio. Lett. 1:306-309 (2005).

Zhao, H. et al., The evolution of color vision in nocturnal mammals, PNAS, 106(22):8980-8985 (2009).

Wang, D. et al., Molecular Evolution of Bat Color Vision Genes, Mol. Biol. Evol., 21(2):295-302 (2004).

Leech, D. et al., Behavioral responses—UVR avoidance and vision, Royal Society of Chemistry, Cambridge, UK, 455-481 (2003).

Sabbah, S., et al., Functional diversity in the color vision of cichlid fishes, BMC Biology, 8(1):133 (2010).

Leigh, R. et al., Finding Attack Strategies for Predator Swarms Using Genetic Algorithms, in Proc. Congress on Evolutionary Computation, 2422-2428 (2005).

Odeen, A. et al., Evolution of ultraviolet vision in the largest avian radiation—the passerines, BMC Evolutionary Biology, 11:313, http://www.biomedcentral.com/1471-2148/11/313 (2011).

Moore, B. et al., Oblique color vision in an open-habitat bird; spectral sensitivity, photoreceptor distribution and behavioral implications, The Journal of Experimental Biology 215:3442-3452 (2012).

Peichl, L., Diversity of mammalian photoreceptor properties: adaptations to habitat and lifestyle? Anat Rec 287:1001-1012 (2005).

Seibold, I., Genetic Differentiation and Molecular Phylogeny of European Aquila Eagles according to Cytochrome b Nucleotide Sequences, Meyburg B-U & R.D. Chancellors eds., Eagle Studies, World Working Group on Birds of Prey (1996).

Tucker, V.A., The Deep Fovea, Sideways Vision and Spiral Flight Paths in Raptors, The Journal of Experimental Biology 203:2745-3754 (2000).

* cited by examiner

WILDLIFE DETERRENCE USING MONO-COLORED LIGHT TO INDUCE NEUROPHYSICAL BEHAVIORAL RESPONSES IN ANIMALS

CROSS REFERENCE TO RELATED APPLICATIONS

The present application claims the benefit of U.S. Provisional Patent Application No. 62/238,158, filed on Oct. 7, 2015, which is incorporated herein by reference in its entirety.

STATEMENT REGARDING FEDERALLY SPONSORED RESEARCH OR DEVELOPMENT

This invention was made with U.S. government support under Grant Number IIP-1215067 and Grant number IIP-1350562, awarded by the National Science Foundation. The government has certain rights in this invention.

TECHNICAL FIELD

The present disclosure relates to wildlife deterrence, and more particularly, to using mono-colored light to induce neurophysical behavioral responses in animals to deter the animals from approaching or intruding a defined area.

BACKGROUND

Wildlife can prove to be a serious problem in several different ways and wildlife deterrence may be desirable in certain areas for the benefit of the area, the activity within the area, the individuals using the area and/or the wildlife. Wildlife deterrence may be desirable, for example, to keep wildlife from crops, aquiculture farms, wind farms, in-flight aircraft, and other undesirable or hazardous locations. In particular, the risk of bird strikes on aircraft is a concern worldwide. Aircraft engines are particularly vulnerable during the takeoff phase when the engine is turning at a very high speed and the plane is at a low altitude where birds are more commonly found. Flocks of birds are particularly dangerous and can lead to multiple strikes. Crashes may even occur when the aircraft is not able to recover in time.

Developing effective, non-lethal methods for wildlife deterrence, which are also minimally invasive to humans, has been a challenge. Non-lethal methods using frightening noises or sights have been used in controlling transient migratory species, but the effectiveness of these techniques is often short-lived. Animal management methods, such as habitat modification, intended to deprive animals of food, shelter, space and water on or around a protected area, have been the most effective long term tactic. While these techniques that modify the habitat can reduce the risk, these methods are only partially effective and have a limited geographic range.

SUMMARY

Consistent with one embodiment, a method includes method includes: defining a deterrence area; determining a species to be deterred within the deterrence area; generating mono-colored light of at least one wavelength within 25 nm of a peak absorption wavelength of a short-wavelength-sensitive (SWS) photoreceptor of the species; and directing the mono-colored light to the deterrence area with a light intensity sufficient to cause a temporary disruption of visual perception in the species to induce an augmented behavioral response resulting in avoidance of the deterrence area.

Consistent with another embodiment, a method includes method includes: defining a deterrence area; determining a species to be deterred within the deterrence area; generating intermittent pulses of mono-colored light of at least one wavelength within 25 nm of a peak absorption wavelength of a short-wavelength-sensitive (SWS) photoreceptor of the species; and directing the mono-colored light to the deterrence area.

Consistent with a further embodiment, a method includes: defining a deterrence area; determining a species to be deterred within the deterrence area; generating mono-colored light of at least one wavelength within a sensitivity range of at least one short-wavelength-sensitive (SWS) photoreceptor of the species; and directing the mono-colored light to the deterrence area with a light intensity sufficient to exceed a light adjusted contrast sensitivity function (CSF) intensity threshold for the species when exposed to the mono-colored light within the deterrence area.

Consistent with yet another embodiment, a system includes at least one light source configured to generate mono-colored light of at least one wavelength within a sensitivity range of at least one short-wavelength-sensitive (SWS) photoreceptor of an avian species to be deterred and to direct the mono-colored light to a deterrence area. The system also includes a controller for controlling the light source to generate the mono-colored light with an intensity of the light within the deterrence area sufficient to exceed a light adjusted contrast sensitivity function (CSF) intensity threshold for the avian species when exposed to the light within the deterrence area.

Consistent with yet a further embodiment, a system includes at least a first light source configured to generate a first mono-colored light of at least one wavelength within 25 nm of a peak absorption wavelength of at least one short-wavelength-sensitive (SWS) photoreceptor of a first species to be deterred and to direct the mono-colored light to a deterrence area and at least a second light source configured to generate a second mono-colored light of at least one wavelength within 25 nm of a peak absorption wavelength of at least one short-wavelength-sensitive (SWS) photoreceptor of a second species to be deterred and to direct the mono-colored light to the deterrence area. The system also includes a controller for controlling the first and second light sources to generate the first and second mono-colored light.

BRIEF DESCRIPTION OF THE DRAWINGS

These and other features and advantages will be better understood by reading the following detailed description, taken together with the drawings wherein.

DETAILED DESCRIPTION

Figure 1:
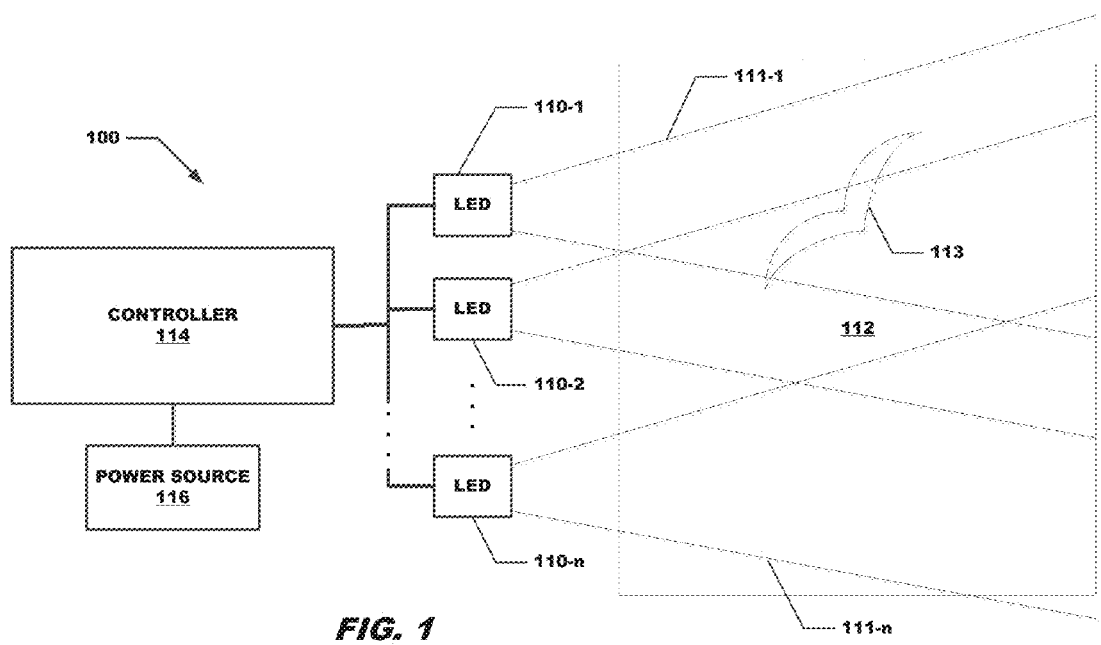
FIG. 1 is a schematic diagram of a wildlife deterrence system using mono-colored light to induce an augmented behavioral response in a species to avoid a deterrence area, consistent with embodiments of the present disclosure.

Methods and systems, consistent with embodiments disclosed herein, provide non-lethal wildlife deterrence by using mono-colored light within a sensitivity range of a short-wavelength-sensitive (SWS) photoreceptor of a species to be deterred, such as, for example, an avian species. The mono-colored light may be generated by one or more high brightness mono-colored light emitting diodes (LEDs) and may be within 25 nm of a peak absorption wavelength of the SWS photoreceptor of the species, for example, a violet sensitive (VS) cone and/or an ultraviolet sensitive (UVS) cone of an avian species. The mono-colored light is directed to a deterrence area with an intensity sufficient to cause at least a temporary disruption of visual perception in the species to induce an augmented behavioral response in the species resulting in avoidance of the deterrence area. The light intensity within the deterrence area may exceed a light adjusted contrast sensitivity function (CSF) threshold intensity for the species when exposed to the mono-colored light within the deterrence area. The mono-colored light may also be generated as intermittent pulses having a duration sufficient to keep a pupil of an eye of the species in a continuous unstable state to prevent light adaption by the species.

Non-lethal wildlife deterrence systems and methods, consistent with the embodiments described herein, relate to the role that the oculo-neuro-motor network plays in the neurophysiology of animal species and how they perceive and interact with their surrounding environment. More specifically, the wildlife deterrence systems and methods involve the disruption of the oculo-neuro-motor responses through the use of mono-colored light of a sufficient intensity to defeat the normal ability to process the sensor information leading to changes in behavior in a nonlethal manner. The morpho-physiological organization of the visual system is dependent upon the unique characteristics of the eye, the post-receptoral mechanisms of the neuro pathways, and the oculo-neuro-motor mechanisms. Different species (e.g., mammal and avian species) exhibit differences in contrast sensitivity, spatial frequency sensitivity, rod/cone concentration and location, which contribute to behaviors of a particular species within its environment.

Behavioral responses to visual stimulus involve several steps. The initiation of vision involves the transduction of light striking the eye to create nerve signals as the visual impulse. Photons striking a photoreceptor with sufficient intensity and appropriate energy (e.g., wavelength) will cause a photochemical reaction creating a nerve impulse that is transmitted to ganglia cells. Signals originating in several photoreceptors pass through a single bipolar cell to a single ganglion cell resulting in synaptic convergence. The ganglia cells are connected to the second cranial nerve (i.e., the optic nerve), which transmits visual information to the vision centers of the brain. In an avian species, the optic nerve is generally larger than the spinal nerve because of the importance of vision to the avian species. Certain mechanisms involved with visual perception may be used to confuse or overwhelm the oculo-neuro network such that the neurophysiological blocking mechanism of the visual system temporarily defeats or disrupts the visual perception of a species, similar to "jamming" mechanisms used to defeat a radar system.

The ability to visualize objects involves the ability to distinguish contrasts and the ability to perceive colors, which differs among different species. The ability to distinguish contrasts may be measured and represented as contrast sensitivity or the contrast sensitivity function (CSF). Humans and monkeys are capable of accommodating about 120:1 ratio light contrast, for example, while avian species are capable of accommodating 12:1 ratio light contrast. As such, the avian species are recognized as having better visual acuity and lower dynamic range compared to humans. The ability to perceive colors involves different types of retinal photoreceptor cells, known as cone cells, which have different but often overlapping absorption spectra or spectral sensitivities. Humans have trichromatic color vision with three distinct types of cones for short (S), medium (M) and long (L) wavelengths; whereas avian species have tetrachromatic color vision with four distinct types of cones including (unlike humans) short-wavelength-sensitive (SWS) cones having sensitivity extending to the ultra-violet (UV) range.

The perception of color is achieved by a process that starts with the differential output of the cone cells and is finalized in the visual cortex and associative areas of the brain. According to the opponent-process theory of color vision, color perception is controlled by the activity of two or more opponent photoreceptor systems. In particular, the medium (M) and long (L) wavelength cones often operate in tandem and the UV and short (S) wavelength cones often operate in tandem. The SWS cones (e.g., UV and S) are often a small percentage of the total cones in the retina and are distributed throughout the retina with a non-uniform density. Thus, the contribution of the SWS cones to the neurological signals is often disproportionately higher than the M and L cones. The mechanism of augmented behavioral response invoked by embodiments of the wildlife deterrence systems and methods described herein involve the contribution of the SWS cones to the dynamic range of neurological signals from the ganglia to the brain, which is disproportionately high compared to the number of SWS cones actually present. Thus, the most effective wavelengths for inducing an augmented behavioral response in a species involve the SWS cones of a species.

The cone-opponent neuro signal processing mechanism is analogous to an electrical circuit design having a limited dynamic range. Exceeding the dynamic range of the circuit results in a saturated signal in which no information can be derived. Similarly, mono-colored light within the sensitivity range of SWS cones of a species and with an intensity exceeding the dynamic range is capable of inducing a saturated neuro signal. Wavelengths closely matched to the SWS cones (e.g., blue or ultraviolet) of the species (i.e., within 25 nm of a peak absorption wavelength) are likely to maximize the effect of the cone-opponent neuro signal processing. A mismatch between the wavelength of the mono-colored light and the peak absorption spectrum of the SWS cones of the species may be compensated by increasing the intensity of the mono-colored light striking the cone.

Light adaptation decreases the sensitivity of the eye to light sources with a higher luminance than a previous level and may result in a saturated neuro signal coming back into a dynamic range in which perceptual information may be obtained. An augmented behavioral response may still be induced by generating mono-colored light at a sufficient intensity to exceed a light adjusted CSF threshold intensity (e.g., as defined by the brightness of the illumination region of the image of the light adapted eye plus the CSF ratio). Light adaption occurs in a sequence of reactions including behavioral avoidance of bright lights, pupil contraction, depletion of photopigment, and cellular adaptation. Light adaptation may also accompanied by a temporary loss in contrast sensitivity at higher luminance levels. Confusion of the color blending functions of the signals from the photoreceptors results in impaired visual perception. This condition is similar to when humans experience a bright light source such a solar glint or solar glare and has difficulty "seeing." Conversely, if the eye becomes light adapted to the light sources with a higher luminance which is suddenly turned OFF, then a depleted neuro signal is below the dynamic range in which perceptual information may be obtained. This condition is similar to when humans enter a dimly lit room immediately after being exposed to bright sunlight or other bright light source and has difficulty "seeing."

Thus, intermittent pulses of mono-colored light may keep the eye in a constant unstable state, preventing the eye from adapting. The change in the pupil size modifies a set point of the CSF that the eye accommodates and the repetition of additional series of pulses induces the vision system to attempt to adapt to a constantly changing set of light conditions. When the ocular-neuro network is overwhelmed in this manner, the ability of the species to maintain visual perception is effectively defeated. This overwhelmed neurological condition results in the interference of neurophysiological processes of the vision system and brain controlling edge detection, motion, optical flow, afterimage, illusions and flicker fusion and may also induce neurophysical illusions. Humans generally do not perceive flicker rates greater than 30 Hz, whereas some avian species can perceive flicker rates greater than 100 Hz.

Field experiments were conducted with a variety of avian species, namely, Osprey, Red-tailed Hawk and the Common Eiders. The tests involved wild species in their natural environments pursuing their natural food sources. Mono-colored high brightness LEDs were placed in visible location in close proximity to the preferred food sources of the three species. The peak spectral emission LED tested included 365 nm, 385 nm, 395 nm, 405 nm, 435 nm, 455 nm, and 470 nm. The 395 nm LED was found to be effective in modifying foraging and nesting behaviors of Osprey and foraging behaviors of Common Eiders. Also, the 455 nm LED was found to be effective in modifying the foraging behaviors of the Red-tailed Hawk. Osprey, Common Eider, and species similar to the Red-tailed Hawk have VS type cones. The difference in behavior of the species was observed when the light was ON and when the light was OFF. With all three species, when the LED was ON, the avian species that approached the food source waited for an extended period of time from a safe distance from the LEDs. As the distance between birds and the mono-colored LEDs decreased, the intensity of behavioral response increased, ranging from subtle changes of flight direction or altitude to complete reversal of flight direction. The safe distance may correlate with the upper limit of the CSF range at which they could observe the food source. If the birds decreased the distance to the LEDs, they exhibited an augmented behavioral response and rarely pursued the food source after such a response.

As used herein, the term "contrast sensitivity function (CSF)" refers to the inverse of the contrast detection threshold (i.e., the lowest contrast at which a pattern can be seen) as a function of spatial frequency and light intensity and is a measure of the ability of a species to detect contrast (and thus to visualize objects). As used herein, "light adjusted CSF threshold intensity" refers to the light intensity at a limit of the dynamic range of the light adjusted eye of a species above which a saturated neuro signal occurs resulting in a substantial loss of contrast sensitivity. As used herein, "augmented behavioral response" refers to a distinct behavioral action made in response to a non-natural stimulus that overwhelms or confuses the oculo-neuro-motor network.

As used herein, the term "sensitivity range" refers to a range of wavelengths that may be detected by a photoreceptor and the term "peak absorption wavelength of a short-wavelength-sensitive (SWS) photoreceptor" refers to a wavelength with a peak absorbance within the sensitivity range of wavelengths that can be detected by the SWS photoreceptor of the species. As used herein, the term "mono-colored" refers to light having a relatively narrow bandwidth within 15-20 nanometers (nm) of a spectrum peak and a "mono-colored" LED generates only light within this narrow spectrum. As used herein, the term "high brightness" refers to LEDs that operate with a high emission power efficiency, greater than 20%. The LEDs may include, for example, LED chips with multiple individual LED die packaged into a single light emitting component requiring from 3 to 100 watts and sometimes more of input power.

Referring to FIG. 1, a wildlife deterrence system 100 generally includes one or more light sources 110-1 to 110-$n$ generating mono-colored light 111-1 to 111-$n$ and directing the mono-colored light 111-1 to 111-$n$ at a deterrence area 112 to deter a species 113 from entering the deterrence area 112. The deterrence area 112 may be on the ground or in the air and may have various shapes and/or sizes. The deterrence area 112 is an area in which deterrence is desired and does not necessarily require absence of all instances of the species 113 from the area 112. Examples of deterrence areas include areas where the species 113 may cause harm or damage as well as areas that may be harmful to the species 113. The species 113 may include a single species or multiple different species.

The light sources 110-1 to 110-$n$ may include, for example, high brightness mono-colored LEDs, which have advantages over other light sources including lower energy consumption, longer lifetime, improved physical robustness, smaller size, faster switching rates, and the capability of narrow bandwidth spectral emission. The mono-colored light 111-1 to 111-$n$ is generated at one or more wavelengths that are more likely to induce an augmented behavioral response in one or more species 113 to be deterred from the area 112. The wavelength(s) of the mono-colored light 111-1 to 111-$n$ include wavelengths that are within a sensitivity range of one or more SWS photoreceptors of one or more species to be deterred and may be matched to the SWS cone(s) of the species, i.e., within 25 nm of the peak absorption wavelength. As discussed above, mono-colored light at such wavelengths is capable of sufficiently disrupting the oculo-neuro-motor responses to defeat the normal ability to process sensory information leading to changes in behavior in a non-lethal manner.

The light sources 110-1 to 110-n may include multiple light sources 110-1 to 110-n of the same wavelength and/or multiple light sources 110-1 to 110-n of different wavelengths associated with deterrence of different species. The system 100 may also include the mono-colored light sources 110-1 to 110-n together with other lights sources, such as white LEDs, providing functions other than deterrence. The wildlife deterrence system 100 may also include other deterrence systems in addition to the light sources 110-1 to 110-n to provide multi-sensory stimuli, which may intensify the behavioral response. Other deterrence systems may include, for example, auditory deterrence systems that produce sounds likely to deter a particular species (e.g., sounds known to frighten a particular species).

The wildlife deterrence system 100 also includes a controller 114 for driving the light sources 110-1 to 110-n and controlling the generation of the mono-colored light 111-1 to 111-n including parameters such as the light intensity and/or the pulse duration. The mono-colored light 111-1 to 111-n may be directed toward the deterrence area 112 and controlled to provide a light intensity within at least a portion of the deterrence area 112 sufficient to cause a temporary disruption of the visual perception in the species within the area 112 to induce the augmented behavioral response. More specifically, the light intensity within at least a portion of the deterrence area may exceed a light adjusted contrast sensitivity function (CSF) intensity threshold for the species when exposed to the light within the deterrence area 112, as discussed above. The controller 114 may control the light sources 110-1 to 110-n together or individually to provide different light intensities.

The controller 114 may also control one or more of the light sources 110-1 to 110-n to provide intermittent pulses of light (e.g., at varying pulse durations) to keep a pupil of an eye of the species in a continuous unstable state to prevent light adaptation by the species. The controller 114 may control the light sources 110-1 to 110-n to provide intermittent pulses, for example, by turning the light sources on and off for different durations. The controller 114 may control the light sources 110-1 to 110-n together or individually.

The controller 114 may include known circuitry, hardware, and/or software for controlling LEDs. A power source 116, such as an external power source or battery power source, may be coupled to or integrated with the controller 114.

Example embodiments of the wildlife deterrence system 100 are used to deter avian species (i.e., birds) and the deterrence area 113 may include areas where birds may be harmed, such as wind farms, and areas where birds may cause harm, such as crops, aquiculture farms, and airways. For an avian species, the SWS photoreceptor may include an ultraviolet sensitive (UVS) cone with a sensitivity range of 350-450 nm and a peak absorption in a range of 360-373 nm and/or a violet sensitive (VS) cone with a sensitivity range of about 400-470 nm and a peak absorption within a range of 402-427 nm. As such, the light sources 110-1 to 110-n may include high brightness UV LEDs, violet LEDs, and/or blue LEDs. The light adjusted CSF intensity threshold of an avian species may thus be exceeded by light (within a sensitivity range of a SWS photoreceptor) having an intensity in the deterrence area greater than $10^{-6}$ W/cm$^2$ or greater than $2 \times 10^6$ photons/mm$^2$. To prevent the eye of the avian species from achieving a light adaptive state, the controller 114 may control one or more of the light sources 110-1 to 110-n to provide intermittent pulses with varying ON pulse durations in a range of 5-1000 ms and varying OFF pulse durations in a range of 20-2000 ms.

Other embodiments of the wildlife deterrence system 100 may be used for different species (e.g., different avian species and/or other animal species) having different sensitivity ranges and peak absorptions of SWS photoreceptors and different contrast sensitivities. The light sources 110-1 to 110-n may have different wavelengths for the different species such as a first set of LEDs for causing neurophysical behavioral responses for a first species and a second set of LEDs for causing neurophysical behavioral responses for a second species. The controller 114 may also control the intensity and/or pulse duration of the light sources 110-1 to 110-n differently for different species.

Figure 2:
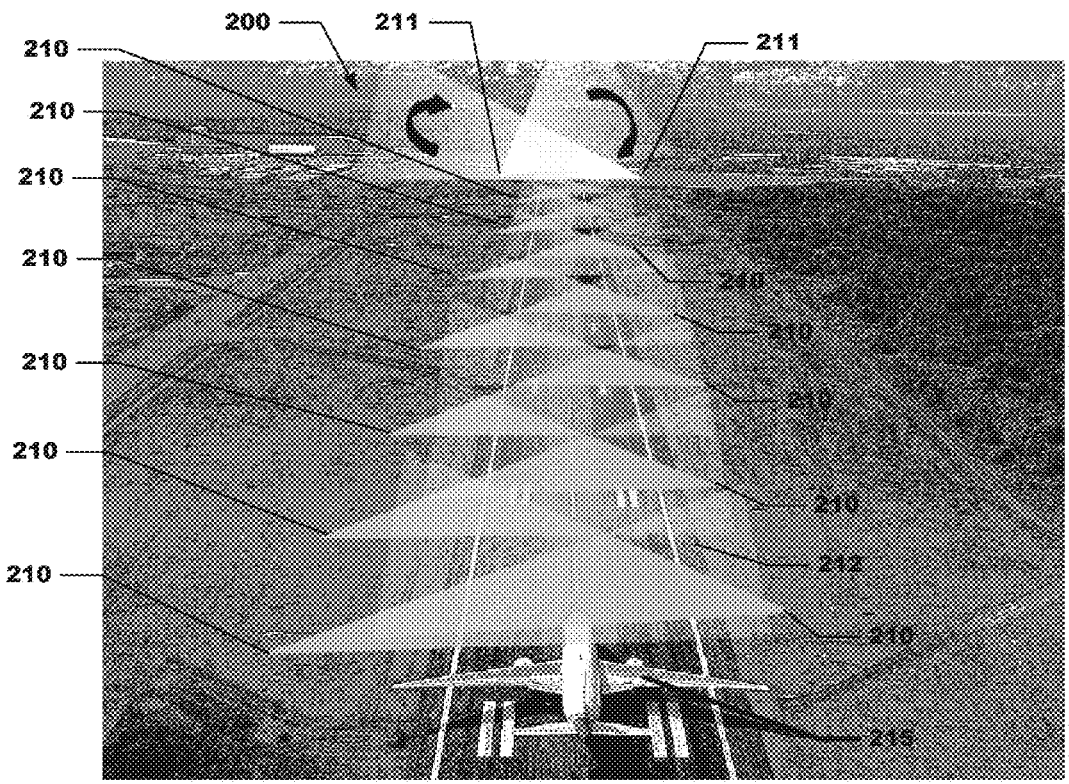
FIG. 2 is top perspective view of an embodiment of a wildlife deterrence system for deterring avian species from entering the airspace proximate a runway at an airport.
Figure 3:
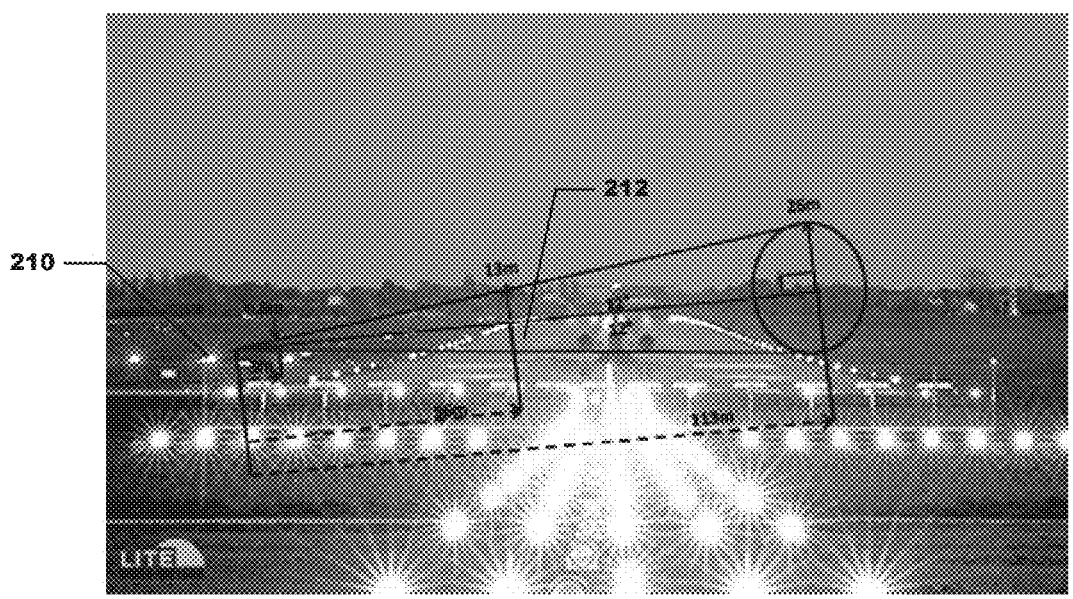
FIG. 3 is a side view of an embodiment of a wildlife deterrence system for deterring avian species from entering the airspace just above a runway at an airport.
Figure 4:
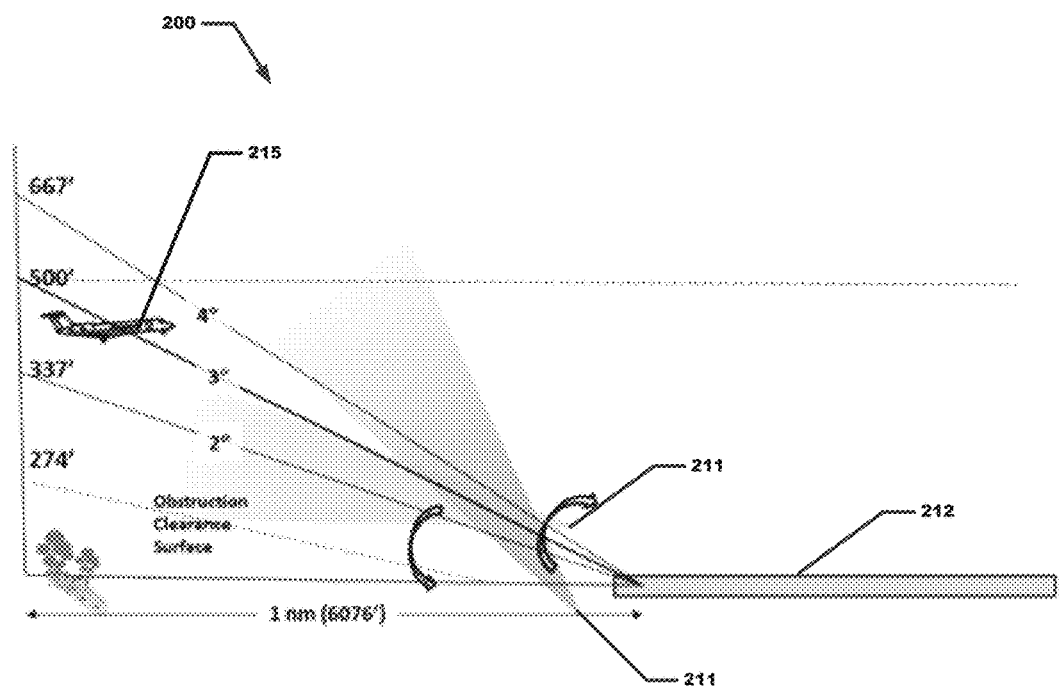
FIG. 4 is a side view of an embodiment of a wildlife deterrence system for deterring avian species from entering the airspace proximate an aircraft approach and take-off slope proximate a runway at an airport.

As shown in FIGS. 2-4, embodiments of a wildlife deterrence system 200 may be used to deter avian species from entering the airspace proximate a runway 212 at an airport. In this embodiment, the deterrence area may be the airspace immediately above the runway 212 and/or the airspace along the approach slope and take-off path of an aircraft 215. A plurality of light sources 210, such has mono-colored high brightness LEDs as described above, are located periodically along one or both sides of the runway 212 to illuminate the airspace immediately above the runway 212. One or more light sources 211 may also be located at the end of the runway for illuminating the airspace along the approach slope and take-off path of the aircraft.

The light sources 210 along the runway 212 may be spaced periodically (e.g., with a spacing of about 100 meters) such that the light emitted from the light sources 210 creates a wall of light forming a linear barrier along the length of the airspace that the aircraft passes through above the runway 212. As shown in FIG. 2, the light sources 210 may be staggered on each side of the runway 212 to provide the linear barrier along the length of the runway 212. As shown in FIG. 3, the light sources 210 along the runway are directed at an angle and generate light capable of providing the desired intensity across the full width of the runway 212. Temporal synchronization by coordinating the illumination from multiple light sources upon a common airspace may also be used to enhance the illuminated intensity, thereby increasing the effective deterrence at a greater distance from the light sources.

As shown in FIG. 4, the light sources 211 at the end of the runway illuminate a narrowly focused beacon of light on an angle that corresponds to the airspace along the approach or take-off slope. The light sources 211 may be capable of generating light that provides a desired intensity over a substantial distance of the approach or take-off slope, for example, 1 nautical mile and/or 500 ft. above ground level (AGL), which corresponds to a typical 3 degree approach slope. The light sources 211 may also be configured to cover varying approach or take-off slopes and may include rotating beacons that sweep the light vertically and/or horizontally across the airspace along the approach or take-off slope to deter birds from the airspace surrounding the approach or take-off slope.

Figure 5:
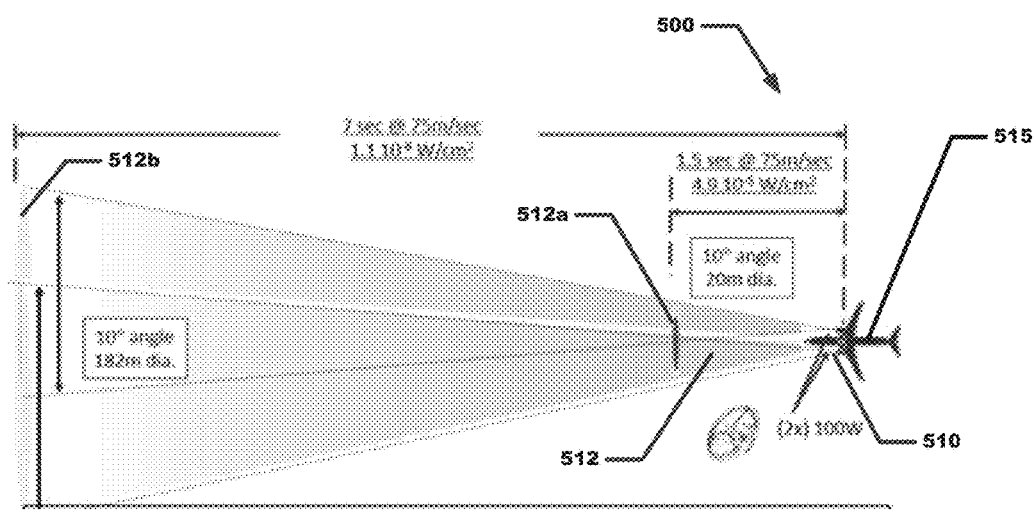
FIG. 5 is a top view of an embodiment of a wildlife deterrence system on an aircraft for deterring an avian species from entering the airspace in the immediate path of the aircraft.

As shown in FIG. 5, another embodiment of a wildlife deterrence system 500 may be used to deter avian species from entering the airspace 512 in the immediate path of an aircraft 515 during flight. In this embodiment, one or more light sources 510 are located on the aircraft 515 (e.g., landing lights) and direct the light (e.g., in the form of a narrowly focused beacon of light) to a deterrence area in the airspace 512 in the immediate path of the aircraft 515. The light sources 510 may be capable of emitting light with a divergence angle to provide the desired intensity across a distance of at least a width of the aircraft 515 and with an intensity capable of inducing an augmented behavioral response before the aircraft 515 reaches the location of the bird.

In one example, light emitted at 100 W with a divergence angle of 10° may provide an intensity of about $4.9 \times 10^{-5}$ W/cm$^2$ across a diameter of about 20 m at a location 512a about 112.5 m in front of the aircraft 515. This should induce an augmented behavioral response in a bird within this area causing the bird to leave the area with enough time (e.g., 1.5 s for an aircraft traveling at 75 m/s) before the aircraft 515 reaches the location. The light will continue to diverge at greater distances from the aircraft 515 with a decreasing intensity. The light emitted at 100 W with a divergence angle of 10° may provide an intensity of about $1.1 \times 10^{-6}$ W/cm$^2$ across a diameter of about 182 m at a location 512b about 525 m in front of the aircraft 515. At these further distances, the intensity of the light may not be sufficient to induce a neurophysical response but may still be sufficient to induce a voluntary or aversion response, such as discomfort, panic, stress or heightened awareness, which may cause some deterrence at these greater distances.

Figures 6, 7:
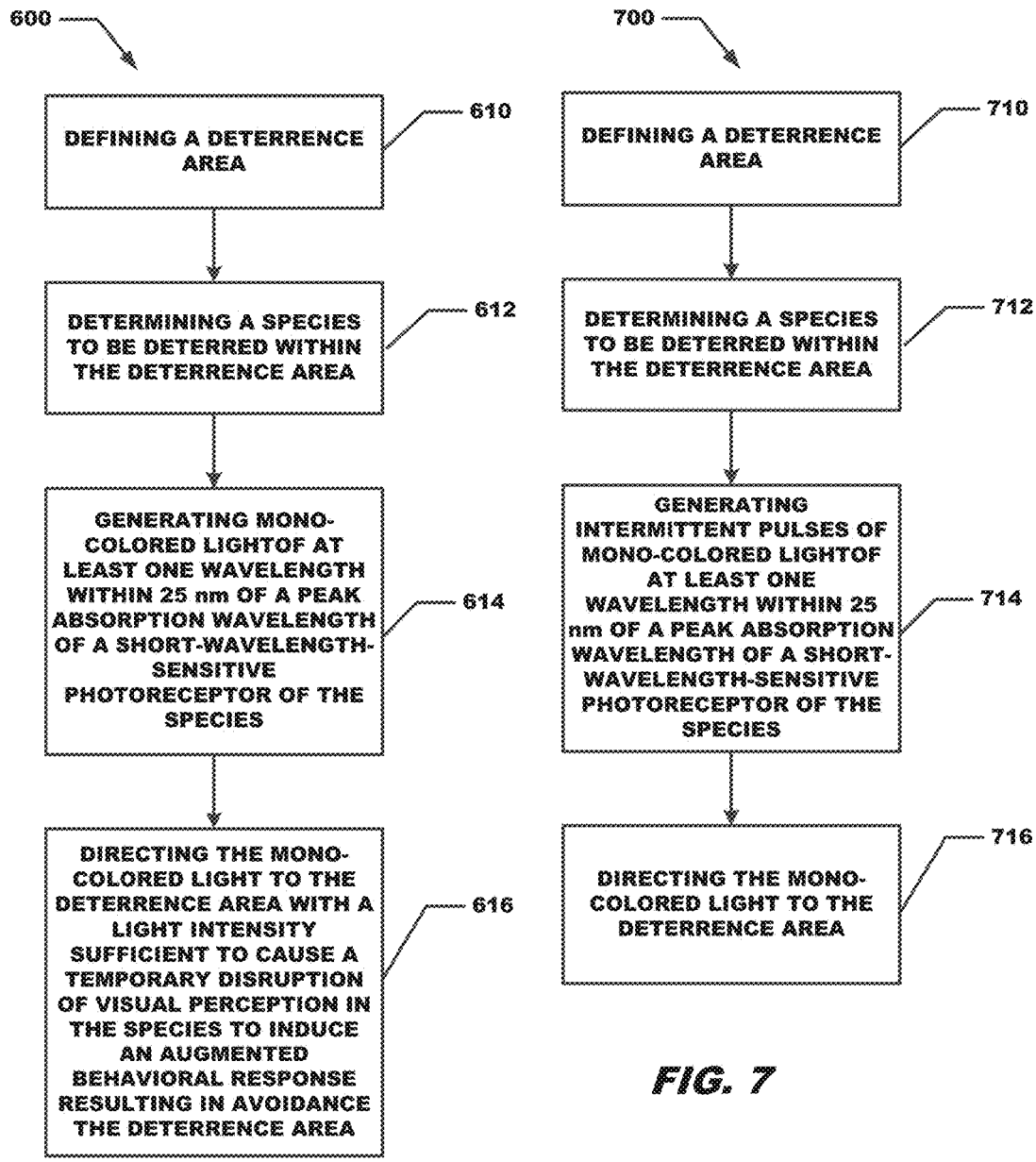
FIG. 6 is a flow chart of a method for wildlife deterrence using mono-colored light to induce an augmented behavioral response in a species, consistent with an embodiment of the present disclosure.
FIG. 7 is a flow chart of a method for wildlife deterrence using mono-colored light to induce an augmented behavioral response in a species, consistent with another embodiment of the present disclosure.
Figure 8:
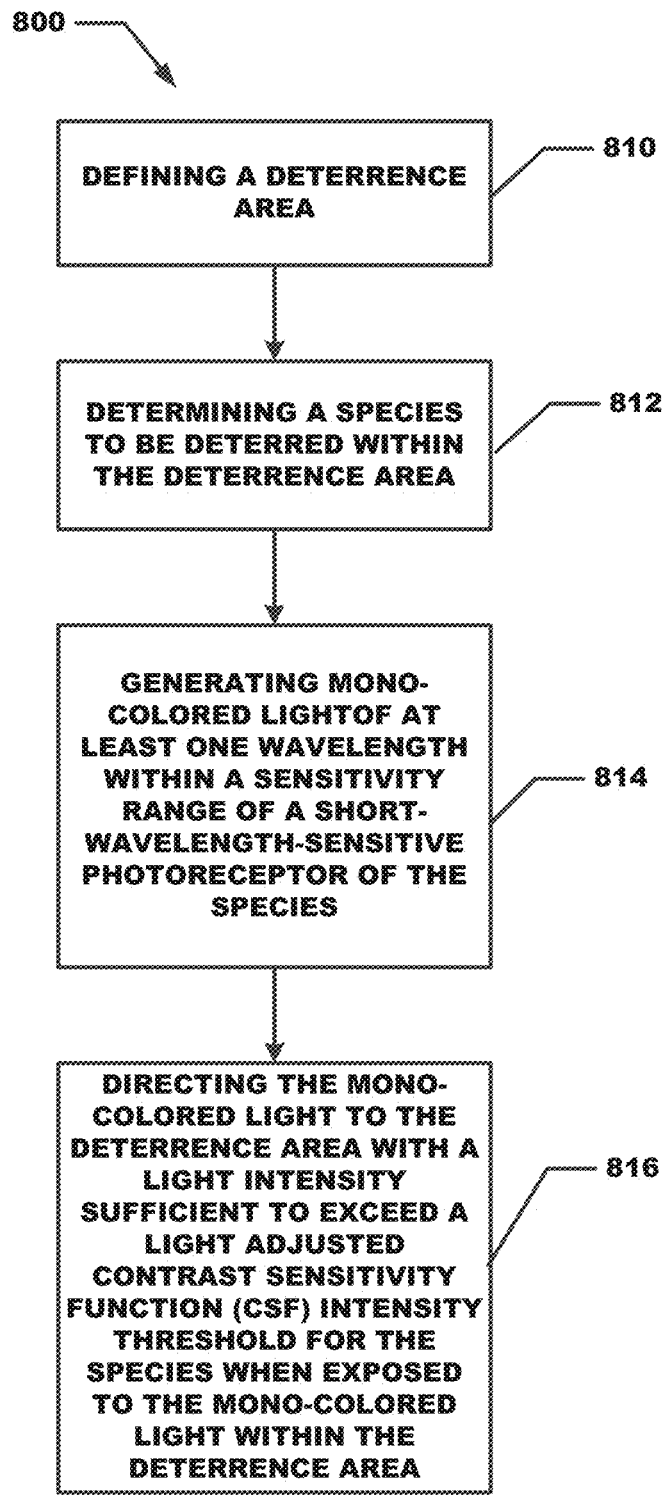
FIG. 8 is a flow chart of a method for wildlife deterrence using mono-colored light to induce an augmented behavioral response in a species, consistent with a further embodiment of the present disclosure.

Referring to FIGS. 6-8, various methods of wildlife deterrence are illustrated and described. It will be appreciated by those of ordinary skill in the art that unless otherwise indicated herein, the particular sequence of steps described is illustrative only and can be varied without departing from the spirit of the invention. Thus, unless otherwise stated the steps described below are unordered meaning that, when possible, the steps can be performed in any convenient or desirable order.

According to one method 600, shown in FIG. 6, a deterrence area is defined 610 and a species to be deterred within the area is determined 612. As described above, for example, the area may be defined relative to an airport runway and/or aircraft and the species may be determined to be the avian species common to that geographical location and area. In other examples, the deterrence area may be defined as other locations that might be harmed by a species, such as crops or aquaculture farms, or that might cause harm to a species, such as wind farms.

The method 600 also includes generating 614 mono-colored light of at least one wavelength within 25 nm of a peak absorption wavelength of a SWS photoreceptor (i.e., an SWS cone) of the species. For an avian species, for example, the mono-colored light may generated within 25 nm of a peak absorption wavelength of a UVS cone and/or VS cone of the species, as discussed above. The mono-colored light may be generated by one or more mono-colored high brightness LEDs, for example, such as a blue LED, violet LED and/or UV LED depending upon the species to be deterred.

The method 600 further includes directing 616 the mono-colored light to the deterrence area with a light intensity sufficient to cause a temporary disruption of visual perception in the species to induce an augmented behavioral response resulting in avoidance of the deterrence area by the species. For an avian species, for example, the light intensity may be greater than $10^{-6}$ W/cm$^2$ or greater than $2 \times 10^6$ photons/mm$^2$. Directing the light may include angling the light, focusing the light, diverging the light, reflecting the light and/or moving the light to provide a desired light intensity across a distance covering at least a portion of the deterrence area. The light does not necessarily need to cover the entire deterrence area at the desired intensity.

According to another method 700, shown in FIG. 7, a deterrence area is defined 710, a species to be deterred within the area is determined 712, and intermittent pulses of mono-colored light of at least one wavelength within 25 nm of a peak absorption wavelength of at least one SWS photoreceptor of the species are generated 714. For an avian species, for example, the intermittent pulses may be generated with a varying pulse duration in a range of 5-1000 ms or in a range of 20-2000 ms to keep a pupil of an eye of the avian species in a continuous unstable state to prevent light adaptation. The mono-colored light is directed 716 to the deterrence area.

According to a further method 800, shown in FIG. 8, a deterrence area is defined 810, a species to be deterred within the area is determined 812, and mono-colored light of at least one wavelength within a sensitivity range of at least one SWS photoreceptor of the species is generated 814. The mono-colored light is directed 816 to the deterrence area with a light intensity sufficient to exceed a light adjusted contrast sensitivity function (CSF) intensity threshold for the species when exposed to the mono-colored light within the deterrence area. For an avian species, for example, the light intensity may be greater than $10^{-6}$ W/cm$^2$ or greater than $2 \times 10^6$ photons/mm$^2$ to exceed the light adjusted CSF intensity threshold.

Accordingly, wildlife deterrence systems and methods, consistent with embodiments of the present disclosure, use mono-colored light at a wavelength and intensity capable of inducing an augmented behavioral response in a particular species, thereby providing an effective and non-lethal deterrence of the species from an area.

Throughout the entirety of the present disclosure, use of the articles "a" or "an" to modify a noun may be understood to be used for convenience and to include one, or more than one of the modified noun, unless otherwise specifically stated.

While the principles of the invention have been described herein, it is to be understood by those skilled in the art that this description is made only by way of example and not as a limitation as to the scope of the invention. Other embodiments are contemplated within the scope of the present invention in addition to the exemplary embodiments shown and described herein. Modifications and substitutions by one of ordinary skill in the art are considered to be within the scope of the present invention, which is not to be limited except by the following claims.

What is claimed is:

1. A method comprising:
defining a deterrence area;
determining a species to be deterred within the deterrence area;
generating mono-colored light of at least one wavelength within 25 nm of a peak absorption wavelength of a short-wavelength-sensitive (SWS) photoreceptor of the species; and
directing the mono-colored light to the deterrence area with a light intensity sufficient to cause a temporary disruption of visual perception in the species to induce an augmented behavioral response resulting in avoidance of the deterrence area.

2. The method of claim 1 wherein the mono-colored light is generated from at least one high-brightness mono-colored LED.

3. The method of claim 1 wherein the species is an avian species.

4. The method of claim 3 wherein the SWS photoreceptor is an ultraviolet sensitive (UVS) cone of the avian species.

5. The method of claim 3 wherein the SWS photoreceptor is a violet sensitive (VS) cone of the avian species.

6. The method of claim 1 wherein the light intensity within the deterrence area is sufficient to exceed a light adjusted contrast sensitivity function (CSF) intensity threshold for the species when exposed to the mono-colored light within the deterrence area.

7. The method of claim 1 wherein the light intensity within the deterrence area is greater than $10^{-6}$ W/cm$^2$ or greater than $2 \times 10^6$ photons/mm$^2$.

8. The method of claim 1 wherein generating the mono-colored light includes generating intermittent pulses of the mono-colored light.

9. The method of claim 8 wherein the intermittent pulses have a duration sufficient to keep a pupil of an eye of the species in a continuous unstable state to prevent light adaption by the species.

10. The method of claim 8 wherein the intermittent pulses have varying ON pulse durations in a range of 5-1000 ms and varying OFF pulse durations in a range of 20-2000 ms.

11. The method of claim 1 wherein the species is an avian species, and wherein generating the mono-colored light includes generating mono-colored light at a first wavelength within a sensitivity range of a violet sensitive (VS) cone of the avian species and at a second wavelength within a sensitivity range of an ultraviolet sensitive (UVS) cone of the avian species.

12. The method of claim 1 wherein generating the mono-colored light includes generating mono-colored light at a wavelength in a range of 335-398 nm and/or in a range of 377-455 nm.

13. The method claim 1 wherein generating mono-colored light includes generating mono-colored light from a plurality of light sources arranged to provide a linear barrier and wherein directing the mon-colored light toward the deterrence area includes illuminating an airspace above a runway for an aircraft.

14. The method claim 1 wherein directing the mono-colored light includes illuminating an airspace along at least one of an approach slope and a take-off slope proximate a runway for an aircraft.

15. A method comprising:
defining a deterrence area;
determining a species to be deterred within the deterrence area;
generating intermittent pulses of mono-colored light of at least one wavelength within 25 nm of a peak absorption wavelength of a short-wavelength-sensitive (SWS) photoreceptor of the species; and
directing the mono-colored light to the deterrence area.

16. A method comprising:
defining a deterrence area;
determining a species to be deterred within the deterrence area;
generating mono-colored light of at least one wavelength within a sensitivity range of at least one short-wavelength-sensitive (SWS) photoreceptor of the species; and
directing the mono-colored light to the deterrence area with a light intensity sufficient to exceed a light adjusted contrast sensitivity function (CSF) intensity threshold for the species when exposed to the mono-colored light within the deterrence area.

17. The method of claim 16 wherein the mono-colored light is generated from at least one high-brightness mono-colored LED.

18. The method of claim 16 wherein the light intensity within the deterrence area is greater than $10^{-6}$ W/cm$^2$.

19. The method of claim 16 wherein the species is an avian species, and wherein the SWS photoreceptor is at least one of an ultraviolet sensitive (UVS) cone of the avian species and a violet sensitive (VS) cone of the avian species.

20. The method of claim 16 wherein generating the mono-colored light includes generating intermittent pulses of the mono-colored light.

21. A system comprising:
at least one light source configured to generate mono-colored light of at least one wavelength within a sensitivity range of at least one short-wavelength-sensitive (SWS) photoreceptor of an avian species to be deterred and to direct the mono-colored light to a deterrence area; and
a controller for controlling the light source to generate the mono-colored light with an intensity of the light within the deterrence area sufficient to exceed a light adjusted contrast sensitivity function (CSF) intensity threshold for the avian species when exposed to the light within the deterrence area.

22. The system of claim 21 wherein the at least one light source is a high brightness mono-colored Light Emitting Diode (LED).

23. The system of claim 21 wherein the at least one light source includes a plurality of light sources arranged to provide a linear barrier for illuminating an airspace above a runway for an aircraft.

24. The system of claim 21 wherein the at least one light source is directed to illuminate an airspace along at least one of an approach slope and a take-off slope proximate a runway for an aircraft.

25. The system of claim 21 wherein the at least one light sources includes a plurality of light sources configured to generate mono-colored light at a plurality of wavelengths within a sensitivity range of at least one short-wavelength-sensitive (SWS) photoreceptor of a plurality of avian species.

26. The system of claim 21 wherein the at least one light source is configured to generate mono-colored light of at least one wavelength within 25 nm of a peak absorption wavelength of at least one of an ultraviolet sensitive (UVS) cone of an avian species and a violet sensitive (VS) cone of an avian species.

27. The system of claim 21 wherein the at least controller is configured to control the light source to generate the mono-colored light with a power that provides a light intensity within the deterrence area that is greater than $10^{-6}$ W/cm$^2$.

28. The system of claim 21 wherein the controller is configured to control the light source to generate intermittent pulses of the mono-colored light.

29. The system of claim 28 wherein the intermittent pulses have varying ON pulse durations in a range of 5-1000 ms and varying OFF pulse durations in a range of 20-2000 ms.

30. A system comprising:
at least a first light source configured to generate a first mono-colored light of at least one wavelength within 25 nm of a peak absorption wavelength of at least one short-wavelength-sensitive (SWS) photoreceptor of a first species to be deterred and to direct the mono-colored light to a deterrence area;
at least a second light source configured to generate a second mono-colored light of at least one wavelength within 25 nm of a peak absorption wavelength of at least one short-wavelength-sensitive (SWS) photoreceptor of a second species to be deterred and to direct the mono-colored light to the deterrence area; and
a controller for controlling the first and second light sources to generate the first and second mono-colored light.

\* \* \* \* \*